US009426842B2

(12) United States Patent
Koppelaar et al.

(10) Patent No.: US 9,426,842 B2
(45) Date of Patent: Aug. 23, 2016

(54) DISTRIBUTED RADIO SYSTEM

(71) Applicant: NXP B.V., Eindhoven (NL)

(72) Inventors: Arie Geert Cornelis Koppelaar, Giessen (NL); Alessio Filippi, Eindhoven (NL); Artur Tadeusz Burchard, Eindhoven (NL); Hong Li, Veldhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/306,676

(22) Filed: Jun. 17, 2014

(65) Prior Publication Data

US 2015/0003550 A1    Jan. 1, 2015

(30) Foreign Application Priority Data

Jul. 1, 2013  (EP) .................................... 13174572

(51) Int. Cl.
*H04B 7/08*   (2006.01)
*H04W 88/08*  (2009.01)

(52) U.S. Cl.
CPC ............... *H04W 88/085* (2013.01); *H04B 7/08* (2013.01)

(58) Field of Classification Search
CPC .. H04B 1/7097; H04B 1/7103; H04B 7/0845; H04B 1/126; H04B 7/0817; H04B 7/0413; H04B 7/0417; H04B 7/0871; H04B 7/0673; H04B 7/08; H04B 7/0802; H04L 1/0631
USPC .......................................... 375/347–350, 267
See application file for complete search history.

(56) References Cited

U.S. PATENT DOCUMENTS

| | | | |
|---|---|---|---|
| 6,349,200 B1 * | 2/2002 | Sabat et al. | 455/403 |
| 6,882,678 B2 * | 4/2005 | Kong et al. | 375/144 |
| 7,002,470 B1 * | 2/2006 | Miao | 340/539.22 |
| 7,573,398 B2 * | 8/2009 | Hoctor et al. | 340/870.12 |
| 7,724,806 B2 * | 5/2010 | Franck et al. | 375/148 |
| 7,830,997 B2 * | 11/2010 | Kawada et al. | 375/347 |
| 7,853,231 B2 * | 12/2010 | Iizuka et al. | 455/277.1 |
| 7,929,985 B2 * | 4/2011 | Khayrallah et al. | 455/550.1 |
| 7,991,372 B2 * | 8/2011 | Fujii et al. | 455/255 |
| 8,095,099 B2 * | 1/2012 | Patel et al. | 455/183.1 |

(Continued)

FOREIGN PATENT DOCUMENTS

| | | |
|---|---|---|
| EP | 1 533 918 A2 | 5/2005 |
| EP | 1 557 962 A1 | 7/2005 |

(Continued)

OTHER PUBLICATIONS

Extended European Search Report for application No. 13174572.1 (Jan. 7, 2014).

(Continued)

*Primary Examiner* — Emmanuel Bayard

(57) ABSTRACT

A distributed radio system comprising a plurality of receivers (1,2,15), each receiver being adapted to receive radio signals and to transmit respective digital signals. The system further comprises a digital communication channel (3) coupled to the plurality of receivers (1,2,15) and adapted to receive the digital signals and to transmit the digital signals. The system comprises a base-band unit (4) coupled to the communication channel (3) and adapted to combine and process the digital signals, the digital signals comprising information available in each receiver (1,2,15) of the plurality of receivers for exploiting a diversity gain.

15 Claims, 6 Drawing Sheets

(56) References Cited

U.S. PATENT DOCUMENTS

| | | | |
|---|---|---|---|
| 8,107,906 B2* | 1/2012 | Lum et al. | 455/137 |
| 8,145,173 B2* | 3/2012 | Nishimura et al. | 455/275 |
| 8,295,380 B2* | 10/2012 | Zhu et al. | 375/267 |
| 8,396,096 B2* | 3/2013 | Noel et al. | 375/148 |
| 8,416,878 B2* | 4/2013 | Botha et al. | 375/267 |
| 8,615,276 B2* | 12/2013 | Tanaka | H04W 36/0094 370/311 |
| 8,659,706 B2* | 2/2014 | Carwana et al. | 348/725 |
| 8,724,750 B2* | 5/2014 | Su et al. | 375/346 |
| 8,837,650 B2* | 9/2014 | Kludt et al. | 375/347 |
| 8,862,081 B2* | 10/2014 | Sutton et al. | 455/138 |
| 8,908,817 B1* | 12/2014 | Rydstrom et al. | 375/347 |
| 2003/0181211 A1* | 9/2003 | Razavilar et al. | 455/450 |
| 2005/0020298 A1* | 1/2005 | Masumoto et al. | 455/552.1 |
| 2007/0021083 A1* | 1/2007 | Maejima | 455/255 |
| 2007/0060055 A1* | 3/2007 | Desai et al. | 455/41.2 |
| 2008/0064356 A1* | 3/2008 | Khayrallah | 455/277.1 |
| 2008/0136971 A1* | 6/2008 | Fujishima et al. | 348/731 |
| 2009/0075611 A1* | 3/2009 | Wada | 455/160.1 |
| 2010/0151908 A1* | 6/2010 | Skarby et al. | 455/562.1 |
| 2010/0197263 A1* | 8/2010 | Dwyer et al. | 455/272 |
| 2011/0130119 A1* | 6/2011 | Gupta | H04W 12/10 455/411 |
| 2011/0200144 A1* | 8/2011 | Adler | H04B 7/0894 375/316 |
| 2011/0235753 A1* | 9/2011 | Horisaki | H04L 5/0039 375/340 |
| 2012/0063553 A1* | 3/2012 | Carwana et al. | 375/347 |
| 2013/0029589 A1* | 1/2013 | Bontu | H04W 16/14 455/7 |
| 2013/0273956 A1* | 10/2013 | Gallagher et al. | 455/509 |
| 2013/0322585 A1* | 12/2013 | Hahm et al. | 375/349 |
| 2014/0073250 A1* | 3/2014 | Singh | H04M 1/0258 455/41.2 |
| 2014/0106688 A1* | 4/2014 | Negus et al. | 455/90.2 |
| 2014/0308899 A1* | 10/2014 | Chen et al. | 455/42 |
| 2014/0355506 A1* | 12/2014 | Schmidl et al. | 370/311 |
| 2014/0368743 A1* | 12/2014 | Yang | 348/731 |

FOREIGN PATENT DOCUMENTS

| | | |
|---|---|---|
| EP | 1 909 423 A1 | 4/2008 |
| WO | 2008/089179 A1 | 7/2008 |
| WO | 2012/153575 A1 | 11/2012 |

OTHER PUBLICATIONS

DiBcom; "White Paper No. 3— Rev B"; retrieved from www.dibcom.com; 4 pages (May 2008).

\* cited by examiner

DISTRIBUTED RADIO SYSTEM

CROSS-REFERENCE TO RELATED APPLICATIONS

This application claims the priority under 35 U.S.C. §119 of European patent application no. 13174572.1, filed on Jul. 1, 2013, the contents of which are incorporated by reference herein.

FIELD OF THE INVENTION

The disclosure relates to a distributed radio system and to a method of operating a radio system.

BACKGROUND OF THE INVENTION

In this application we shall use the term "mobile" with the meaning of a device mounted on a vehicle as a car, airplane, etc.

Mobile devices such as e.g. receivers, transmitters are more and more used in cars, avionics i.e. in objects that are changing their position in time. The communications are normally implemented using wireless communications. Each communication device used in these environments has a physical layer. The physical layer (PHY) of a wireless communication device usually includes an antenna, a transceiver, and a baseband processing unit. The connection between the antenna and the transceiver normally uses a cable that should have good transfer properties for the signals that are either captured by the antenna or have to be sent by the antenna as e.g. small reactance, small resistance. These signals are normally modulated at a Radio Frequency (RF), such that the propagation through the air is possible. The cable properties have to be such that the modulated signals experience hardly any distortion and attenuation, e.g. coaxial cables. Since attenuation scales with the cable length, cable length should be kept to a minimum. Also, for cost reasons, there is a motivation to reduce the use of lengthy cables with stringent transfer characteristics to a minimum.

In some cases, a long cable cannot be easily avoided. For example, a communication device in a car experiences the challenges of having an antenna at a position that is favorable for reception/transmission conditions e.g. on the roof of the car and a transceiver and baseband processing unit that is placed at the head-unit or in the trunk. The trend of using more antennas for Receiving/Transmitting (Rx/Tx) diversity and Multiple Input Multiple Output (MIMO) for improving the communication properties as e.g. robustness, throughput increases the need of lengthy cables.

Moreover, it is desirable to have a scalable solution such that a multi-antenna communication device delivering a service that can be easily extended with more communication devices which deliver a multitude of services without requiring a lot of costly cables.

RF cables can be avoided when the transceiver is located close to the antenna. When the baseband processing unit is placed close to the antenna, no expensive RF cables are necessary.

However, this approach, although possible, severely limits the potential diversity gain of multiple antenna solutions. A solution that combines scalability with antenna diversity is shown in FIG. 1. In this solution, several baseband signals of DVB-T demodulators are combined in order to achieve diversity gain. The system comprises three receivers 100, 105 and 110, each receiver being connected to a respective antenna 103, 108, 113 for receiving RF signals. Each receiver comprises a respective tuner 101, 106, 111 and a respective baseband i.e. DVB-T demodulators 102, 107, 112 for demodulating the signals received from the respective tuners. A drawback of this solution is that the DVB-T demodulators have to be co-located close to each other and therefore lengthy costly cables cannot be avoided between the antennas and tuners.

An alternative solution is shown in FIG. 2. FIG. 2 depicts the structure of a signal used on a serial interface targeting the communications among multiple tuner chips and a baseband chip.

The signal comprises a header, the header including a whitening seed W and synchronizing bits Y. The header is followed by a payload comprising the I/Q signal and the status bits. However, the system of FIG. 2 shares the same oscillator, and this is not possible in a distributed architecture involving long distances between its multiple components. The information shared among the multiple tuner ICs includes a forwarded clock signal. The system provides a clock recovery from a whitened data signal included in the transmitted data.

Part of the Automated Gain Control (AGC) loop of this solution is done over the communication channel. This might be an unnecessary limitation as the AGC loop can be implemented close to the antenna but also close to the communication channel.

The structure of a frame for exchanging data between tuner and baseband processing is shown in FIG. 2 and this specific structure can be further used in other configurations.

A tuner mat comprise typically an input circuitry for adapting to an antenna, the antenna receiving an incoming RF radio signal in a specific frequency range and having a certain modulation as e.g. frequency modulation (FM), amplitude modulation (AM), orthogonal frequency division multiplexing (OFDM), etc. The tuner further comprises an amplifier for amplifying the incoming RF signal and for delivering an amplified RF signal. The tuner further comprises a local oscillator (LO) which generates a signal of frequency $f_o$ which is provided to a mixer. The mixer further receives the amplified RF signal having a frequency $f_{RF}$ and delivers an intermediate frequency (IF) signal which has the frequency $f_i = f_{RF} - f_o$. If $f_{RF} = f_o$, then the resulting signal is situated in the baseband and the receiver is called zero-IF receiver. The mixer may be active or passive. For quadrature modulated input signals as the OFDM ones, the mixer comprises two mixing sections: one for the in-phase component (I) and another one for Quadrature one (Q). Usually, a feedback from the mixer to the amplifier is provided in order to keep the overall gain of the amplifier at a desired level, independent of the input frequency. This feedback is usually defined as the Automatic Gain Control (AGC). The feedback is usually controlled by a controller which is adapting it at appropriate time events as e.g. during the preambles of the packets or during guard intervals. The control data from the controller, which normally is a digital one, might be transmitted to the next stages in the radio. The radio may also have a Received Signal Strength Indication (RSSI) which is an indication of the received RF signal intensity. The RSSI signal is also available as a digital signal and therefore it can be easily transmitted to other stages. The AGC and RSSI can be easily embedded in any serially transmitted information provided that a parallel to serial converter is provided.

The Analog to digital converter (ADC) transforms the IF signal into a digital one. The ADC acquisition process and output generation is controlled by a clock signal (Ck). Without limitation, the ADC could be either a Nyquist e.g. flash, Successive Approximation (SAR) one or Sigma-Delta one (SD). The digital signal may be present as a parallel digital word for example as in the flash AD converter case. In this case serializer i.e. a parallel to serial converter, is connected to the output of the converter that transforms the parallel digital word into a serial one. Alternatively, the ADC may provide directly a serial output.

A baseband system is considered to receive the digital IF and to demodulate it according to the type of modulation of the signal. This demodulation applies specific algorithms that might be implemented either in hardware, software or a combination thereof. The demodulation could be made in full i.e. at the output of the baseband system the demodulated useful signal is obtained, or partially i.e. part of the demodulation is carried out in a first subsystem and the remaining part is carried out in a different subsystem, not necessary situated on the same chip or module with the first subsystem.

In wireless communications, diversity gain is considered to be the increase in signal-to-noise ratio due to some diversity scheme, or how much the transmission power can be reduced when a diversity scheme is introduced, without a performance loss. Diversity gain is usually expressed in decibel, and sometimes as a power ratio.

Throughout the present description, equal reference numbers used in different figures refer to same devices or features.

SUMMARY OF THE INVENTION

It is an object of present invention to provide a distributed radio system which may preserve the advantage of diversity and may reduce the costs associated with long or expensive communication cables.

It is described a distributed radio system comprising:
a plurality of receivers, each receiver being adapted to receive radio signals and to transmit respective digital signals;
a digital communication channel coupled to the plurality of receivers and adapted to receive the digital signals and to transmit the digital signals;
a base-band unit coupled to the communication channel and adapted to combine and process the digital signals; the digital signals comprising information available in each receiver of the plurality of receivers for exploiting a diversity gain.

The signals transmitted on long wires are prone to be disturbed by e.g. electrical noises on the lines or from the environment. Therefore, it is necessary to be sure that in the baseband reliable digital signals are processed, i.e. having a well-defined value 1 and a well-defined value 0. Hence, the threshold detector may generate a noiseless digital signal, which is then processed by the baseband unit. If this is done after the full demodulation of the signal then the diversity gain might be lost.

The proposed solution addresses the problem of long and expensive coax cables since the digital communication channels usually use cheaper cables, e.g., Ethernet cable, serial link cable or even no cables in case of digital wireless communications. Preferably, the digital signals are transmitted serially.

In an embodiment of the invention each receiver comprises:
an antenna for receiving the radio signals;
a tuner adapted to receive the radio signals and to down convert the radio signals and to transmit a down-converted signal;
an analog to digital converter adapted to receive the down-converted signal and to transform the down-converted signal into the digital signal.

The communication channel comprises a digital link or an Ethernet link. The link may be a serial one. The communication channel may also comprise a wireless connection.

In another embodiment, the base-band unit is included in one of the receivers. The digital communication channel transmits control signals to the base-band unit for controlling the gain of the tuners and control signals for data selection.

In an embodiment, each analog to digital converters is coupled to a respective digital front end, each digital front end being coupled to the digital communication channel. The digital front end may be a passive digital front end. In this approach correction means adapted to correct imperfections of the analog front end are placed locally, directly after the ADC.

These means may include provisions fir correcting I/Q-mismatch, DC-offset, carrier frequency offset and symbol time offset. The values that are used in the correction units are estimated in the baseband processing unit and are then communicated over the digital communication channel. The programming of the tuner may be also done over the digital communication channel, e.g. carrier frequency and tuner gain. Since, the ADC maybe oversampled, the signal may be decimated in order to lower the data rate over the digital communication channel.

The digital front end may be an active digital front end. In some applications it is necessary to have short latency control loops, in particular for packet based communication it is important provide fast acquisition of the received signals. In this case, it might be necessary to have the estimation of one or more correction values close to the place where they are applied. When both the correction and the estimation of the correction values are done locally close to the antenna, we call this approach "ADC and active digital front end". Also the tuner gain control (AGC) algorithm may be situated locally.

In another embodiment of the invention, each of the analog to digital converters is coupled to a respective digital front end, each digital front end being further coupled to a respective channel estimation and equalization block, each channel estimation and equalization block being coupled to the digital communication channel. This functionality may be extended with equalization and channel estimation. This approach off-loads the combining and baseband processing unit with these tasks but the penalty is that channel estimation data is transferred over the digital communication channel in order to be able to facilitate the combining of the signals. In decision directed equalization, in which the outer receiver is incorporated in the decision, the output of the outer receiver may be made available to the channel estimation/equalization algorithms. Depending on the dynamics of the channel conditions, the feedback loop may require short latency.

Preferably, the distributed radio system is mounted on a vehicle.

It is also presented a method of communication for a distributed radio system comprising steps of:
receiving radio signals via each of a plurality of antennas;
digitizing and serializing the respective signals;
transmitting the digitized signals via a digital communication channel;
processing the digitized signals in a base-band unit.

The invention is defined by the independent claims. Dependent claims define advantageous embodiments.

BRIEF DESCRIPTION OF THE DRAWINGS

The above and other advantages will be apparent from the exemplary description of the accompanying drawings in which.

DETAILED DESCRIPTION OF EMBODIMENTS

Figure 1:
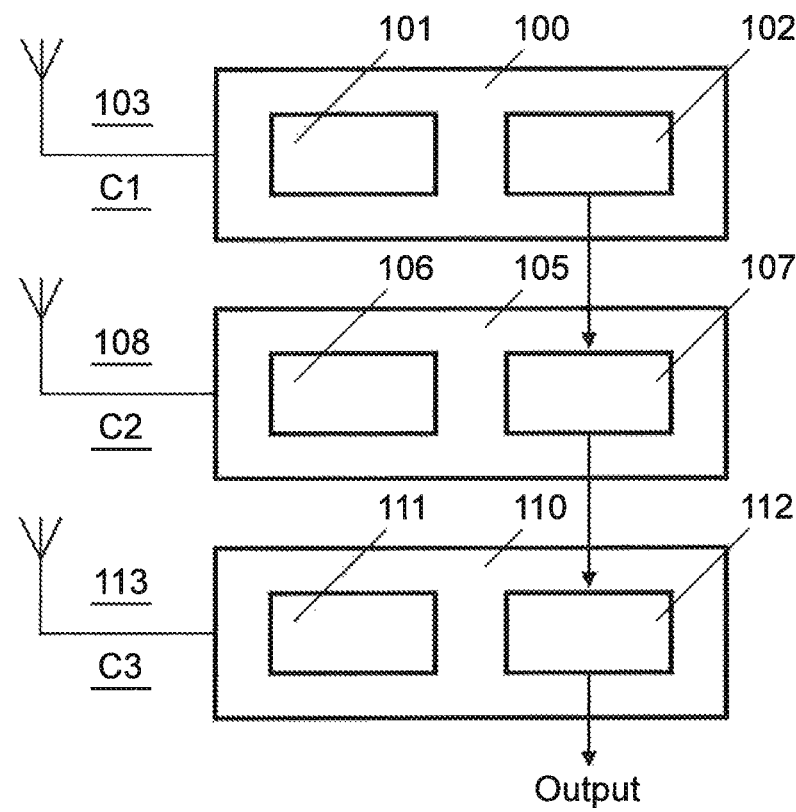
FIG. 1 depicts DVB-T diversity solution of DibCom.
Figure 2:
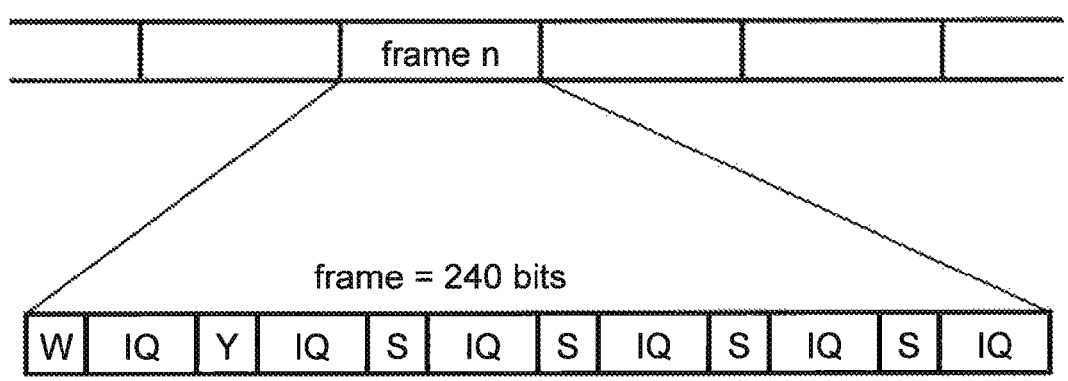
FIG. 2 depicts multiplexing of demodulation data and meta-data.
Figure 3:
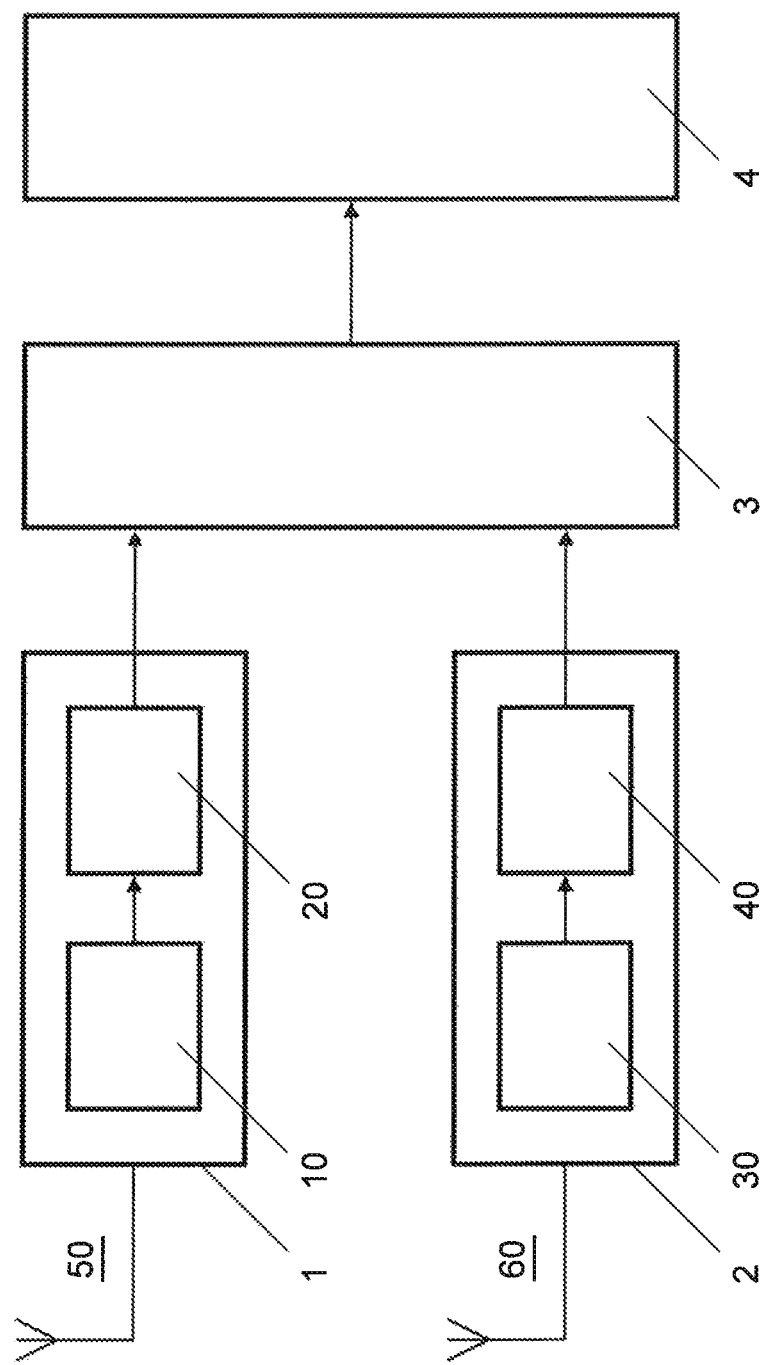
FIG. 3 depicts distributed radio system according to the invention.

FIG. 3 depicts distributed radio system. It is shown a distributed radio system comprising a plurality of receivers 1,2, 15, each receiver being adapted to receive radio signals and to transmit respective digital signals. The system further comprises a digital communication channel 3 coupled to the plurality of receivers 1,2,15 and adapted to receive the digital signals and to transmit the digital signals and a base-band unit 4 coupled to the communication channel 3 and adapted to combine and process the digital signals. The digital signals comprise information available in each receiver 1,2,15 of the plurality of receivers for exploiting a diversity gain.

Each receiver comprises an antenna for receiving a wireless signal, the antenna being coupled to a tuner adapted to down convert the wireless signal and to transmit a down-converted signal to an analog to digital converter (ADC), the ADC transforming the down converted signal into the digital signal to be transmitted to the digital communication channel 3. The communication channel may comprise a digital serial link or an Ethernet link, or can be a wireless link.

The concept presented in this application is based on distributing baseband processing over several separately located units i.e. they are not located on the same printed circuit board (PCB) or chip. The distribution of baseband processing is done by splitting the baseband processing in such a way that further processing and possibly combining of partly or fully demodulated signals may be done in another unit maintaining the diversity gain. The distribution of baseband processing requires communication of the processed baseband signals over a digital communication channel as it is shown in FIG. 3. Both signal data and control data may be exchanged over the digital communication channel.

One or more antenna radio signals are processed by a block which shifts the signal from RE to an intermediate frequency (IF) which is suitable to be digitized e.g., IF, near IF, or zero-IF. The signal is then sampled by an Analog-to-digital converter (ADC). The output of the ADC is a digital signal which may be transmitted via the digital communication channel 3 to a baseband unit 4 where the algorithms for combining the multiple digital signals are usually implemented. The digital communication channel 3 may be a serial link, an Ethernet link or any other link that includes the required adaptation of the output of the ADC to the selected digital communication channel. The proposed solution addresses the problem described in the introductory part since the digital communication channels usually use much cheaper cables, e.g., Ethernet cable, serial link cable or even no cables in case of digital wireless communications, and the output of the ADC conserves all the signal information required for the diversity gains. If the bare output of the ADC is not the preferred choice for transmitting information because of the high data rate and the presence of digital algorithms are used only to control the tuner and the ADC settings, then the distributed radio system shown in FIG. 4 may be used.

Figure 4:
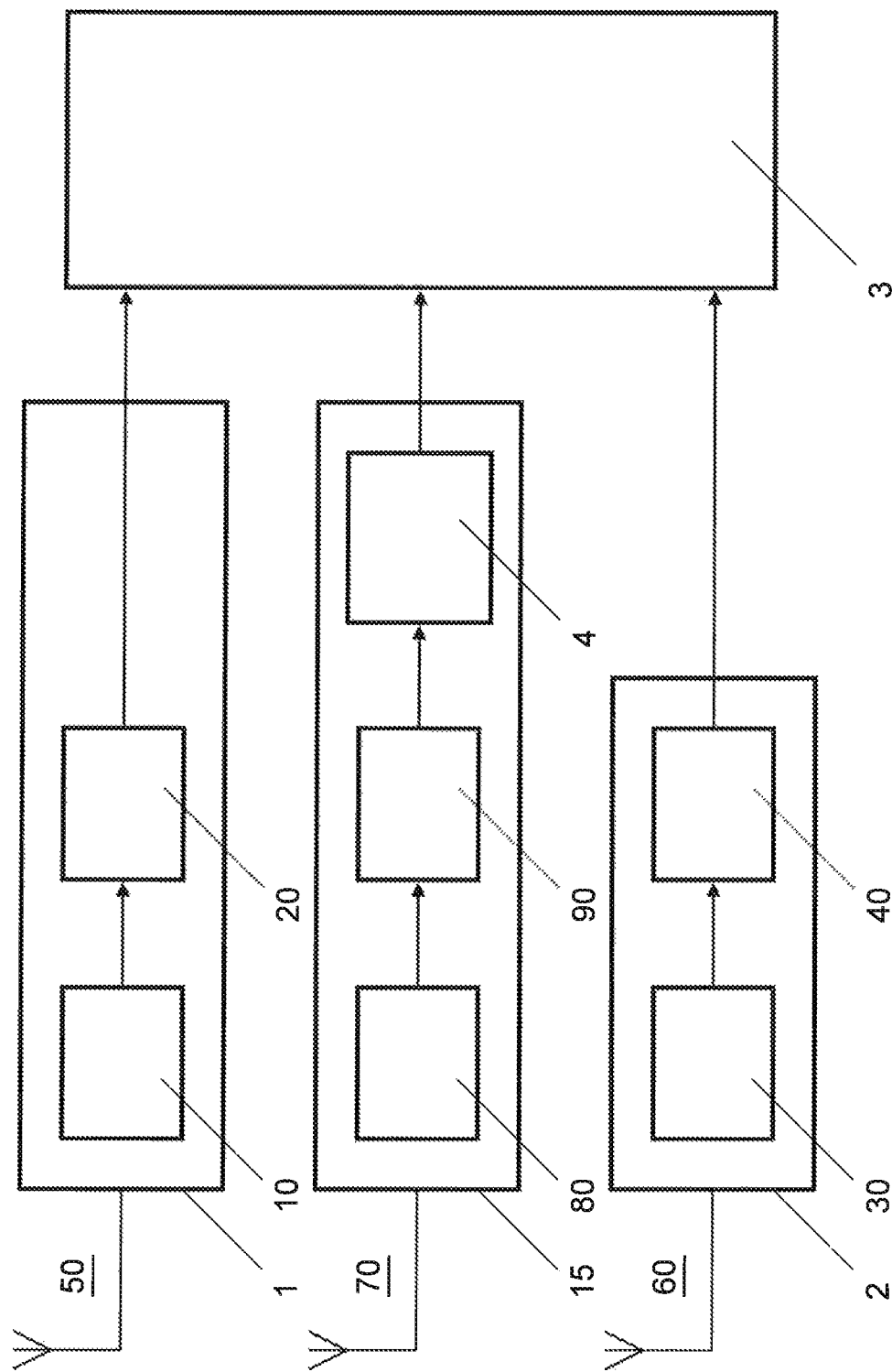
FIG. 4 depicts another distributed radio system, according to the invention.

FIG. 4 depicts another distributed radio system. It is shown a distributed radio system, wherein the base-band unit is included in a receiver 15 of the plurality of receivers. The digital communication channel 3 transmits to the base-band unit 4 control signals for controlling the gain of the tuners and control signals for data selection.

In this approach, the digital communication channel 4 may include a forward link and a feedback link transmitting the following data:

on the forward link it is transmitted the output signals of the ADCs 20, 40. Depending on the digital demodulation approach, the data rate maybe higher than the Nyquist data rate determining that the ADCs may be implemented as a Nyquist ADC with a serial output, or as an over-sampled ADC as e.g. a sigma-delta one.

The feedback link comprises control signals for tuner 10, 30, 80 gain control. Tight time constraints may apply for this control in order to enable a fast locking on the incoming radio signals. The feedback link also comprises data for channel selection as e.g. carrier frequency or channel number.

Figure 5:
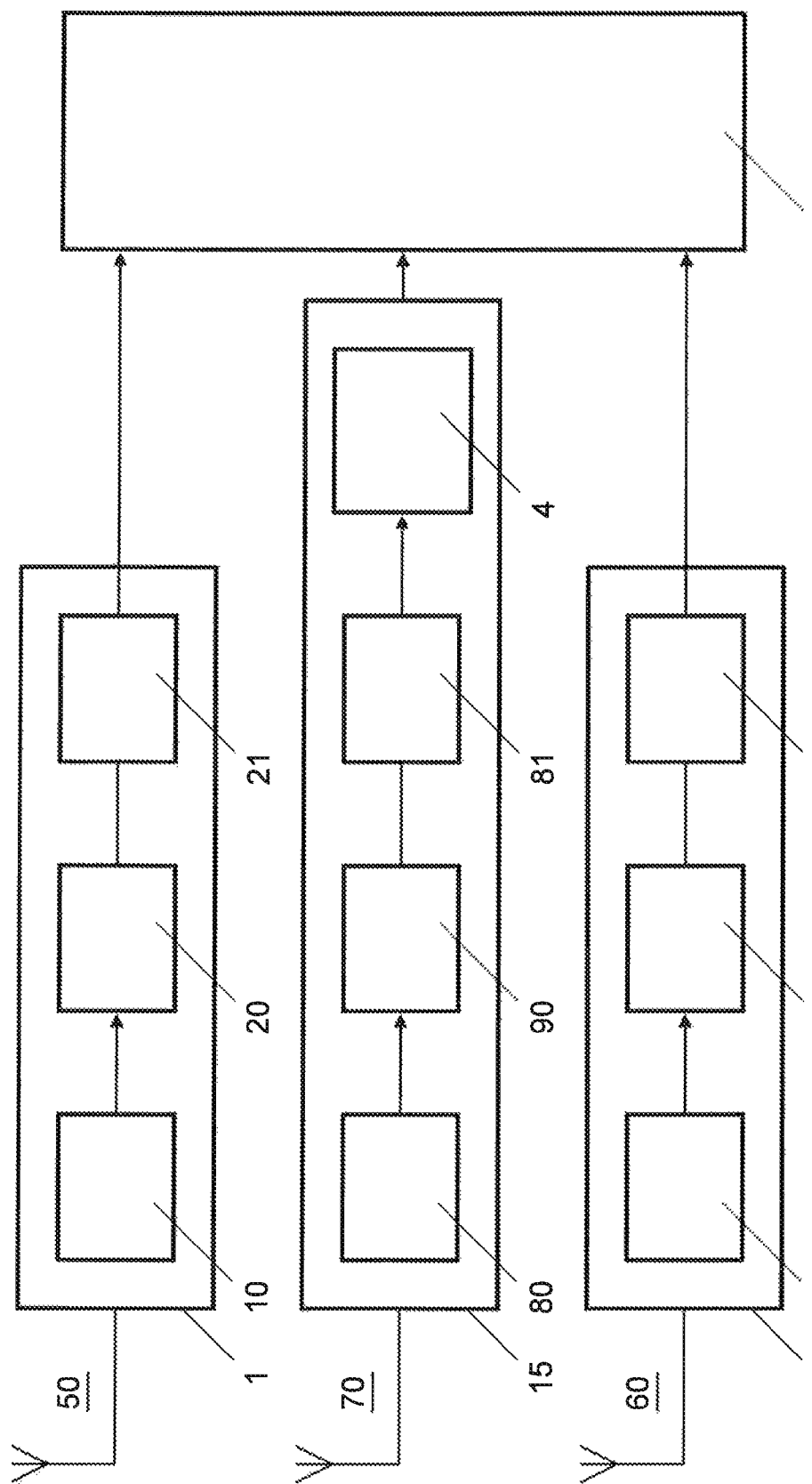
FIG. 5 depicts a distributed radio system using passive digital front end; according to an embodiment of the invention.

FIG. 5 depicts a distributed radio system using passive digital front end.

In this approach Digital Front Ends (DFE) 30, 31, 81 are provided for correcting imperfections of the analog front end and are placed locally directly after the ADC. The DFE 30, 31, 81 may include means for correcting I/Q-mismatch, DC-offset, carrier frequency offset and symbol time offset. The values that are used in the correction units are normally estimated in the baseband unit 4 and are communicated over the digital communication channel 3. Programming the tuner 10, 30, 80 may be done over the digital communication channel 3 as e.g. carrier frequency and tuner gain. Since, the ADC may be oversampled, the signal may be decimated in order to lower the data rate over the digital communication channel.

We may define a forward link and a feedback link as follows.

Forward link is used for the output of the AD converter, corrections Depending on the digital demodulation approach, the data rate maybe higher than Nyquist data rate as in the previous implementation.

Feedback link is used for tuner programming i.e. comprising data for channel selection as e.g. carrier frequency or channel number and for the tuner gain. It also includes data comprising correction values for I/Q-mismatch, DC-offset, carrier frequency offset and symbol time offset. The control algorithms for tuner gain, frequency offset and symbol time offset etc., may be, in this approach, distributed over the baseband unit 4 for estimation process, and blocks close to the antenna for correction purposes.

Figure 6:
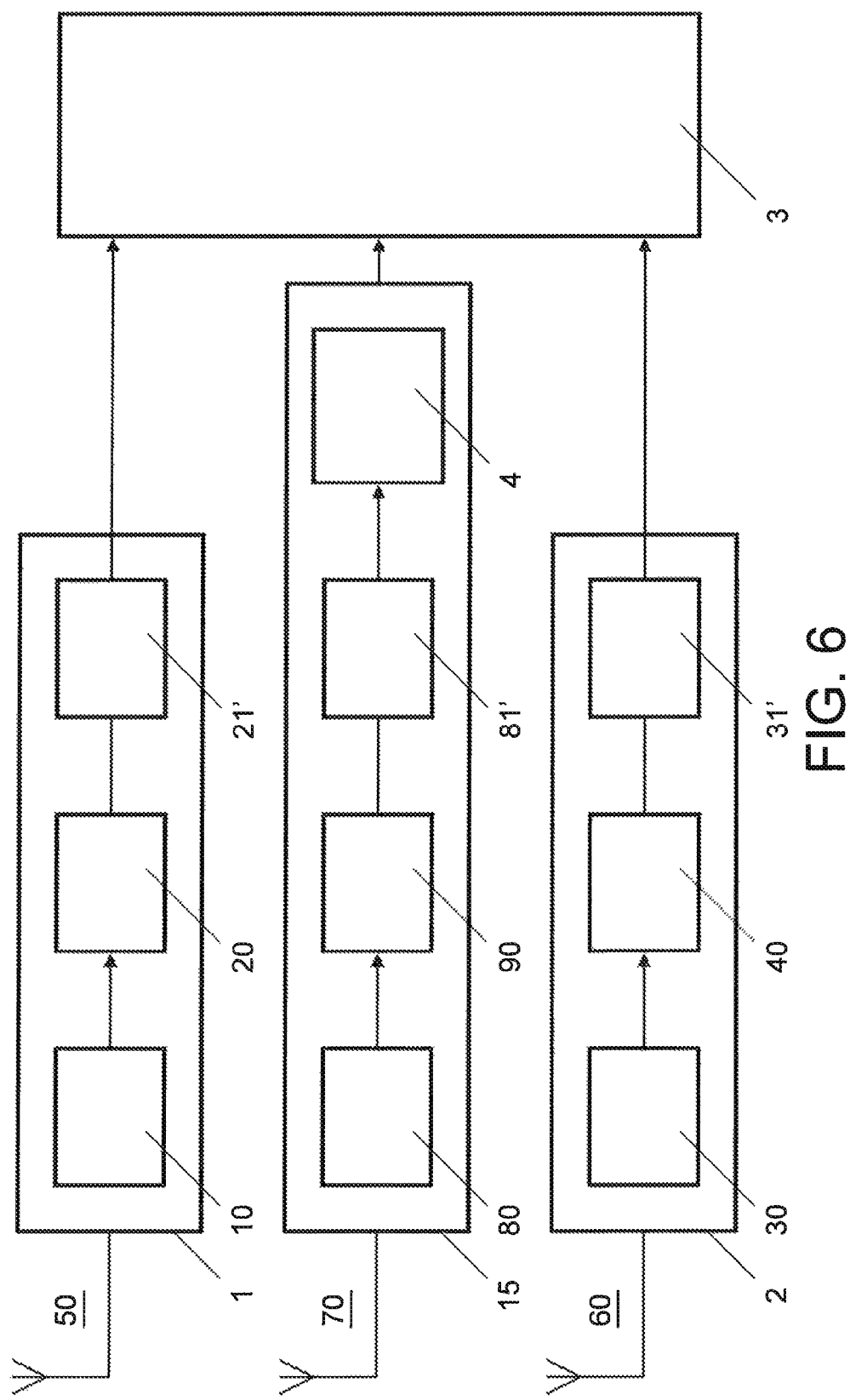
FIG. 6 depicts a distributed radio system with active digital front end; according to an embodiment of the invention.

FIG. 6 depicts a distributed radio system with active digital front end. The figure depicts a distributed radio system, wherein each of the analog to digital converters 20, 40, 90 is coupled to a respective digital front end 21',31',81', each digital front being coupled to the digital communication channel 3.

In some applications it might be necessary to have short latency control loops, in particular for packet based communication it is important to provide fast acquisition on the received signals. In that case it might be necessary to have the estimation of one or more correction values close to the place where they are applied. When both the correction and the estimation of the correction values are done locally close to the antenna we label this approach "ADC and active DFE".

Also the tuner gain control algorithm may be implemented locally. Like in the previous approach, decimation of the ADCs outputs may be carried out locally in order to reduce the data rate over the digital communication channel 3.

Even if in the previous paragraphs the approaches of passive and active DFE plus tuner have been presented, it is appreciated that not all correction value estimation means should be placed exclusively close to the antenna or near the baseband unit.

The forward link and feedback link are used as follows:

The forward link may be used for the output of the ADC, corrections for I/Q-mismatch, DC-offset, carrier frequency offset and symbol time offset. Depending on the digital demodulation approach, the data rate may be higher than Nyquist data rate.

Feedback link is used for tuner programming: data for channel selection, e.g. carrier frequency or channel number.

Figure 7:
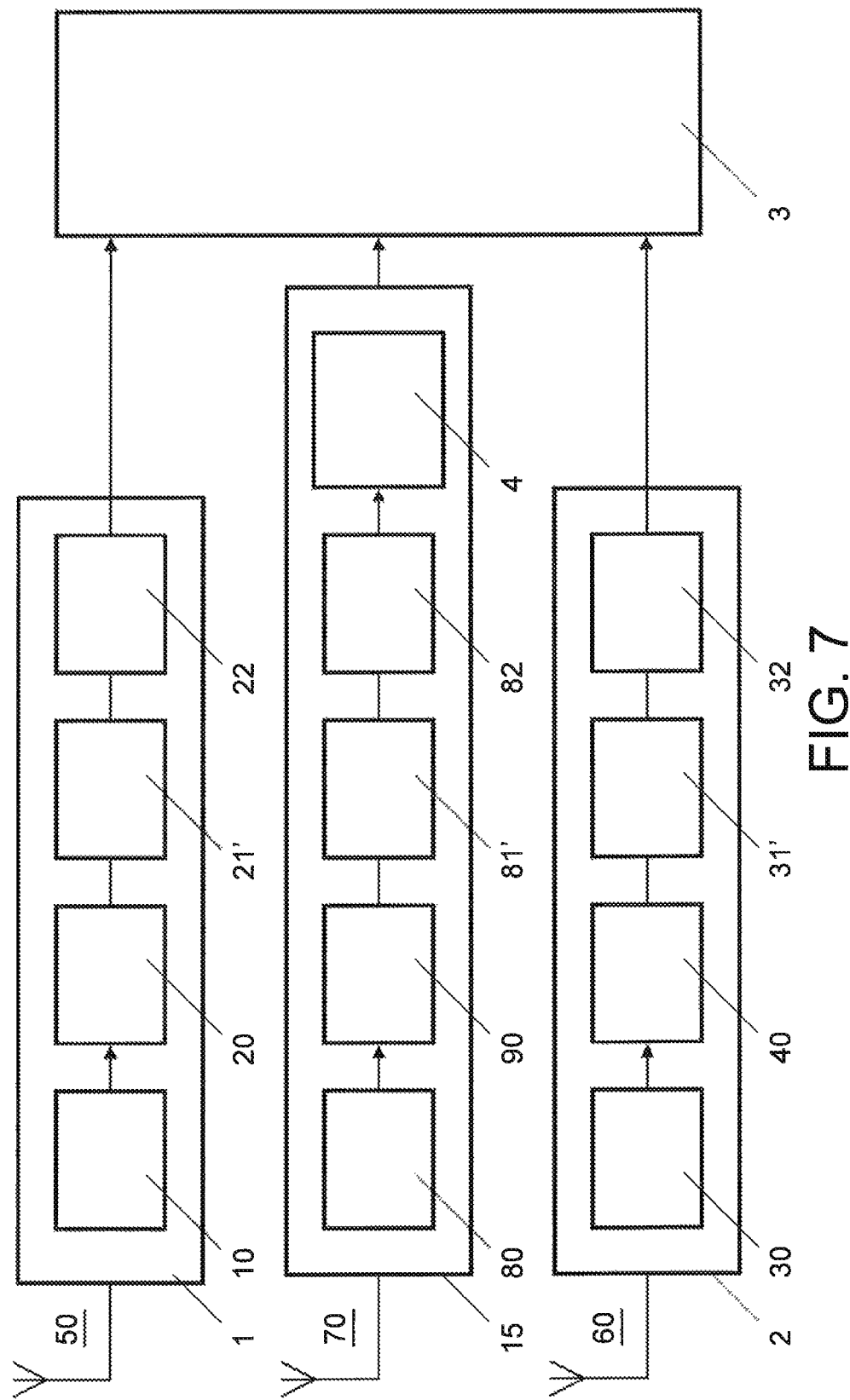
FIG. 7 depicts another distributed radio system according to the invention.

FIG. 7 depicts another distributed radio system according to the invention. In the distributed radio system each of the analog to digital converters 20,40,90 is coupled to a respective digital front end 21',31',81' each digital front end being coupled to a respective channel estimation and equalization block 22,32,82 each channel estimation and equalization block being coupled to the digital communication channel 3. The functionality of the previously presented embodiments may be extended with equalization and channel estimation. In this approach, the combining and baseband processing is carried out is this additional block and the respective operations are off-loaded from the baseband unit 4. As a direct consequence, the channel estimation data is transferred over the digital communication channel 3 in order to be able to facilitate the combining of the signals. If decision directed equalization is used i.e. the receiver is incorporated in the decision, the output signal of the receiver is available to the channel estimation/equalization algorithms. Depending on the dynamics of the channel conditions, the feedback loop may require short latency.

Forward link comprises the output of equalizer. Redundant information to help the equalizer maybe removed leaving the signal at a tower than Nyquist data rate. Channel estimation data may be used for combining the signals.

Feedback link comprises data for channel selection, e.g. carrier frequency or channel number. In case of decision directed channel estimation and/or equalization, the output of the receiver is provided to the channel estimation and/or equalization algorithms.

Depending on the standard the receiver system is targeting, there might be different preferred partitioning of the physical layer algorithms and therefore a different choice for the distributed system may be made.

Therefore, a combination of any of the previously presented partitions of the receiver system may be made as it is shown in the following paragraph.

For an AM Radio: When the Automatic Gain Control (AGC), which is a Meta Data signal, is done locally, the applied tuner gain needs to be communicated to the central secondary baseband processing in order to do optimal combining of two or more radios.

For an FM Radio: Preferred combining method is phase diversity i.e. equal gain combining, because of FM threshold effect. Signals should be aligned in time and phase and therefore the applied tuner gain has to be known and compensated for. Preferably, the AGC control may be closer to the antenna. The gain compensated digital samples are tagged with the applied gain. At the combining unit the two or more streams should be combined using equal gain combining and the applied tuner gain is used for this purpose. Moreover, the two or more streams are combined in time and their phases should be aligned. Therefore, the streams should be brought to a common clock domain using cross-correlation techniques. The difference in reception path latency should be compensated for.

For a Digital Radio/TV using OFDM (DAB, HD Radio, DVB-T, ISDB-T): Several splits may be made, resulting in a trade-off between data rates to be exchanged and amount of processing close to the antenna. A preferred place for splitting the physical layer is after sub-channel equalization. However for software de-mapping, the channel state information per sub-channel is needed and should therefore be exchanged as well. Exchange of data is done on base of OFDM symbols and meta-data includes an OFDM symbol number such that the corresponding OFDM symbols are combined.

For a Digital Radio/TV using single carrier modulation: When the system should be robust against multipath, channel equalization is needed. When decision directed equalization is used, decisions of the combined signal are more reliable and preferred for the equalizer update algorithm. The positioning of the equalizer close to the antenna, requires communication of the decisions made after the combiner to the equalizer units. The feedback of the decisions is not needed when the equalization is done for the individual radios at the central baseband processing unit.

For an IEEE802.11a,g,n,p & ac. (WiFi, ITS) radio: These standards use OFDM modulation, so concerning receiver partitioning, the same holds as for Digital Radio/TV using OFDM. IEEE802.11p differs in the fact that it is used in highly mobile channel such that preamble based channel estimation does not suffice and one may use decision directed approaches. Another difference is that IEEE802.11 is a half-duplex communication standard, such that next to reception, also transmission over multiple antennas (MIMO and Tx diversity) should be solved. The standard requires that symbol clink and carrier frequency are derived from the same reference. Furthermore the transmission of the several antennas should be time-aligned (ranging over the digital communication channel can be used to estimate the latency between baseband and transceiver).

For a Radar system working in the frequency range of 60 GHz and having several antennae and a combiner: In case of no co-located antennae, the distribution of the local oscillator (LO) may be a challenge. When frequency modulated continuous wave (FMCW) is used, the reception/demodulation is done with the modulated LO that is used for transmission. Phase aligned LO distribution over a distributed architecture maybe difficult.

If the signal is a digital signal, e.g. a DAB, HD-radio, China Multimedia Mobile Broadcast (CMMB), Integrated Service Digital Broadcast-Terrestrial (ISDB-T), DVB-T, Wi-Fi IEEE802.11a, it includes information in the form of known pilots which can be used to find the proper time and frequency and frame synchronization. The combining unit is then capable of properly combining the multiple outputs of the ADCs. The reduction of the data rate over the digital channel could be achieved by implementing part of the baseband processing just after the ADC. In general all the functions that drive the RF to baseband block could run locally. Furthermore, the time and frequency synchronization of the digital data could run locally, the channel estimation and also pilot extraction. Also the data equalization could run locally, but it would then require a different set of data to be transmitted over the digital communication channel. The data should then include the channel state information and time stamps.

It is remarked that the scope of protection of the invention is not restricted to the embodiments described herein. Neither

The invention claimed is:

1. A distributed radio system comprising:
   a plurality of distributed receivers not sharing a same oscillator, each receiver being adapted to receive a same radio signal and to transmit respective digital signals;
   a digital communication channel coupled to the plurality of receivers and adapted to receive the digital signals and to transmit the digital signals;
   a base-band unit coupled to the communication channel and adapted to combine and process the digital signals;
   wherein the baseband processing is split in such a way that further processing and combining of partly demodulated signals may be done in another unit while maintaining the diversity gain and the signal and a control data are exchanged over the digital communication channel; and
   the digital signals comprising information available in each receiver of the plurality of receivers for exploiting a diversity gain of the same radio signal.

2. A distributed radio system comprising as claimed in claim 1,
   wherein the digital signals are adapted to be transmitted serially.

3. A distributed radio system as claimed in claim 1,
   wherein each receiver comprises:
      an antenna for receiving the radio signals;
      a tuner adapted to receive the radio signals and to down convert the radio signals and to transmit a down-converted signal; and
      an analog to digital converter adapted to receive the down-converted signal and to transform the down-converted signal into the digital signal.

4. A distributed radio system as claimed in claim 1,
   wherein the communication channel comprises a digital serial link or an Ethernet link.

5. A distributed radio system as claimed in claim 1,
   wherein the communication channel comprises a wireless connection.

6. A distributed radio system as claimed in claim 1,
   wherein the base-band unit is included in a receiver of the plurality of receivers.

7. A distributed radio system as claimed in claim 6,
   wherein the digital communication channel is adapted to transmit control signals to the base-band unit for controlling a gain of the tuners and data selection.

8. A distributed radio system as claimed in claim 6,
   wherein each analog to digital converter is coupled to a respective digital front end the respective digital front end being coupled to the digital communication channel.

9. A distributed radio system as claimed in claim 8,
   wherein the digital front end is a passive digital front end.

10. A distributed radio system as claimed in claim 8,
    wherein the digital front end is an active digital front end.

11. A distributed radio system as claimed in claim 8,
    wherein each digital front end is coupled to a respective channel estimation and equalization block, the channel estimation and equalization block being coupled to the digital communication channel.

12. A vehicle comprising a distributed radio system as claimed in claim 1.

13. The distributed radio system of claim 1:
    wherein the plurality of receivers are distributed over a vehicle.

14. A method of communication for a distributed radio system comprising steps of
    receiving a same radio signal via each of a plurality of antennas and a plurality of distributed receivers not sharing a same oscillator;
    digitizing and formatting the respective signals from each of the receivers;
    transmitting the digitized signals via a digital communication channel;
    processing the digitized signals in a base-band unit, wherein the baseband processing is split in such a way that further processing and combining of partly demodulated signals may be done in another unit while maintaining a diversity gain and the signal and a control data are exchanged over the digital communication channel.

15. A method of communication for a distributed radio system as claimed in claim 14,
    wherein formatting the respective signals comprises the step of serializing the digitized signals.

* * * * *